1

2,776,281

CERTAIN DIHYDRO - BENZOXAZINE - ONES AND DIHYDRO BENZOTHIAZINE-ONES AND PROCESS

William B. Wright, Jr., Woodcliff Lake, N. J., assignor to American Cyanamid Company, New York, N. Y., a corporation of Maine No Drawing. Application January 30, 1956, Serial No. 561,999

12 Claims. (Cl. 260—244)

This invention relates to new organic compounds. More particularly, it relates to 3-hydroxy- and 3-alkoxy-2,3-dihydro-1,3-benzoxazine-4-ones and 2,3-dihydro-1,3-benzothiazine-4-ones and methods of preparing the same.

A series of dihydrobenzoxazones was described by Horrom et al., J. A. C. S. 72, 721 (1950). Also compounds of this type were prepared by Ingram et al., Journal of the Chemical Society (1947), page 763. The compounds described in the prior art do not contain a hydroxyl or alkoxyl radical in the 3-position and therefore differ markedly in physiological properties from the compounds of the present invention.

The compounds of the present invention may be illustrated by the following structural formula:

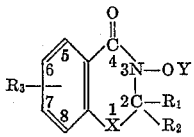

in which X is oxygen or sulfur, Y is hydrogen or lower alkyl, $R_1$ is hydrogen, $R_2$ is an alkyl, aralkyl or aryl radical, $R_1$ taken together with $R_2$ may form a carbocyclic ring, $R_3$ is hydrogen, hydroxyl or halogen radicals.

The present application is a continuation-in-part of my copending application Serial No. 291,078, filed May 31, 1952, now abandoned.

These compounds are, in general, crystalline solids having a definite melting point. They are soluble in the usual organic solvents and only slightly soluble in water.

Compounds are prepared by reacting an aromatic hydroxamic acid with an aldehyde or cyclic ketone in the presence of a mineral acid catalyst. The reaction which takes place may be illustrated by the following equation:

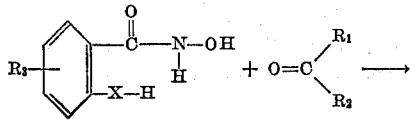 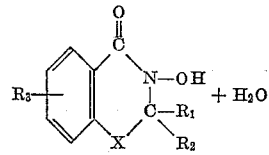

in which $R_1$, $R_2$, $R_3$ and X are as previously defined.

Some of the hydroxamic acids used as starting material are known compounds, the preparation of which is described in the chemical literature. These compounds may be, for example, salicylhydroxamic acid; 2-mercaptobenzhydroxamic acid and derivatives thereof in which $R_3$ is as previously defined.

The second intermediate may be, in general, any aldehyde or cyclic ketone, for instance, they may be compounds such as cyclohexanone; cyclopentanone; p-chlorobenzaldehyde; o-methylcyclohexanone; isobutyraldehyde; benzaldehyde; o-chlorobenzaldehyde; 3,4-dichlorobenzaldehyde; tolualdehyde; propional; butyral; acetaldehyde; heptaldehyde; cyclohexylcarboxyaldehyde; nitrobenzaldehyde; acetamidobenzaldehyde; o-methoxybenzaldehyde; piperonal; p-dimethylaminobenzaldehyde, etc.

The process of the present invention is carried out in the presence of a mineral acid which acts as a catalyst in causing the condensation and ring formation. Acids such as sulfuric, hydrochloric, hydrobromic, phosphoric, etc., may be used in the reaction.

In carrying out the reaction it is usually not necessary to use a separate solvent as an excess of the aldehyde or cyclic ketone can be used. However, if a solvent is desired, an inert solvent such as chloroform, carbon tetrachloride, methylene dichloride, toluene, diethyl ether, dibutyl ether, benzene, or the like may be used. While it is not necessary to pass the refluxing solvent through an anhydrous substance, such as calcium chloride or sodium sulfate, it is advantageous to do so since the water formed in the reaction is thereby removed. Accordingly, solvents which form azeotropes with water are the preferred solvents. In removing the water in this manner, the overall yield of desired product is improved, thereby making the process more desirable.

The reaction to prepare the compounds of the present invention is generally carried out under refluxing conditions and therefore, the temperature is dependent upon the particular solvent used. In general, the temperature may range from about 50° C. to about 100° C. The time required for completing the reaction may vary from 30 minutes to about 24 hours, it being somewhat dependent upon the particular intermediates used, as well as the solvent, if any.

The compounds of the present invention are useful both as fungicides and as bacterial growth inhibitors, as shown in the following Tables I and II.

TABLE I.—ANTIFUNGAL AND ANTIBACTERIAL ACTIVITY

[Minimal inhibitory concentrations in mg. per ml.]

| Compound Name | Fungi | | | | | | Bacteria | | | | | | | | Notes |
|---|---|---|---|---|---|---|---|---|---|---|---|---|---|---|---|
| | C. a. | S. c. | M. r. | F. e. | H. c. | T. m. | Myco. | Staph. | Sarc. | Subt. | Pseud. | E. coli | Prot. | Sal. | |
| 3-Hydroxy-spiro-(2,3-dihydro-1,3-benzoxazine-4-one-2,1'-cyclohexane) | 0.5 | 0.5 | 0.25 | 0.5 | 0.5 | 0.25 | 0.06 | 0.25 | 0.25 0.06p | 0.03 | >1.0 | >1.0 | 1.0 0.12p | 1.0 | 1 |
| | 1.0 | 0.5 1.0 | 0.25 | 0.5 >1.0 | 0.5 >1.0 | 0.12 | 1.0 | >1.0 | >1.0 | 0.5 | >1.0 | >1.0 | >1.0 | >1.0 | 1 |
| 3-Hydroxy-2-phenyl-2,3-dihydro-1,3-benzoxazine-4-one | >1.0 | 0.25p | 0.25 | 0.25p | 0.25p | 0.12 | | | | | | | | | 2 |
| | | | | | | | 1.0 | >1.0 | >1.0 | 1.0 | >1.0 | >1.0 | >1.0 | >1.0 | 3 |
| 3-Hydroxy-4'-methyl-spiro-(2,3-dihydro-1,3-benzoxazine-4-one-2,1'-cyclohexane) | 0.5 >1.0 | 0.25 | 0.12 | 0.25 >1.0 | 0.5 >1.0 | 0.12 | 0.06 | 0.06 | 0.06 | ≦0.03 | >1.0 | >1.0 | 1.0 0.25p | >1.0 | 1 |
| | 0.25p | >1.0 | 0.12 | 0.06p | 0.12p | 0.12 | | | | | | | | | 3 |
| | | | | | | | 0.06 | 0.12 | 0.06 | 0.06 | >1.0 | 0.25 | 0.25 | 0.25 | 1 |
| 3-Hydroxy-2-isopropyl-2,3-dihydro-1,3-benzoxazine-4-one | 0.5 | 0.5 | 0.25 | 0.5 0.5 | 0.5 0.5 | 0.12 | 0.25 | 0.5 | 0.25 | 0.12 | >1.0 | >1.0 | 0.25 | 1.0 | 2 |
| | 0.25 | 0.25 | 0.12 | 0.12p | 0.12p | 0.12 | | | | | | | | | |
| | | | | | | | 0.25 | 0.5 | 0.5 | 0.25 | >0.5 | >0.5 | 0.5 | >0.5 | 3 |
| 3-Hydroxy-3'-methyl-spiro-(2,3-dihydro-1,3-benzoxazine-4-one-2,1'-cyclohexane) | 0.25 0.5 | 0.25 | 0.12 | 0.25 0.5 | 0.25 | 0.12 | 0.06 | 0.06 | 0.06 | ≦0.03 | >1.0 | >1.0 0.5p | 0.25 | 1.0 | 1 |
| | 0.12p | 0.25 | 0.12 | 0.06p | 0.5 | 0.12 | | | | | | | | | 2 |
| | | | | | | | 0.06 | 0.12 | 0.06 | 0.06 | >1.0 | >1.0 | 0.25 | 0.5 | 3 |

TABLE II.—ANTIFUNGAL AND ANTIBACTERIAL ACTIVITY

[Minimal inhibitory concentrations in mg. per ml.]

| Compound Name | Fungi | | | | | | Bacteria | | | | | | | | Notes |
|---|---|---|---|---|---|---|---|---|---|---|---|---|---|---|---|
| | C. a. | S. c. | M. r. | F. e. | H. c. | T. m. | Myco. | Staph. | Sarc. | Subt. | Pseud. | E. coli | Prot. | Sal. | |
| 2(p-chlorophenyl)-3-hydroxy-2,3-dihydro-1,3-benzoxazine-4-one | 0.5 >1.0 | 0.5 | 0.5 >1.0 | 0.5 >1.0 | 0.25 >1.0 | 0.12 | 0.5 | 0.5 | 0.5 | 0.5 | >1.0 | >1.0 | 1.0 | 1.0 | 1 |
| | 0.12p | >1.0 | 0.12 | 0.5p | 0.5p | 0.06 | | | | | | | | | 2 |
| | | | | | | | 0.5 | 1.0 | 1.0 | 1.0 | >1.0 | >1.0 | 1.0 | 1.0 | 3 |
| 3-Hydroxy-spiro-(2,3-dihydro-1,3-benzoxazine-4-one-2,1'-cyclopentane) | 0.5 1.0 | 0.25 | 0.12 | 0.5 | 0.5 | 0.12 | 0.12 | 0.25 | 0.25 | 0.12 | >1.0 | 1.0 0.5p | 0.25 | 1.0 | 1 |
| | 0.25p | 0.25 | 0.12 | 0.12 | 0.25 | 0.12 | | | | | | | | | 2 |
| | | | | | | | 0.25 | 0.5 | 0.25 | 0.12 | >1.0 | 1.0 | 0.5 | 1.0 | 3 |
| 6-Bromo-3-hydroxy-spiro-(2,3-dihydro-1,3-benzoxazine-4-one-2,1'-cyclohexane) | 1.0 >1.0 | 1.0 >1.0 | 0.1 1.0 | 0.1 >1.0 | >1.0 >1.0 | 0.25 or 0.12 >1.0 | 0.25 | 0.25 | 0.12 | 0.12 | >1.0 | 1.0 | 1.0 | >1.0 | 1 |
| | | | | | | | 0.12 | 0.12 | 0.12 | 0.12 | >1.0 | 1.0 | 0.25 | >1.0 0.5p | 2 3 |
| 3,6-Dihydroxy-spiro(2,3-dihydro-1,3-benzoxazine-4-one-2,1'-cyclohexane) | >1.0 | >1.0 | 1.0 | 1.0 | >1.0 | 1.0 | 0.12 | 0.5 | 0.25 | 0.5 | >1.0 | 1.0 | 0.5 | >1.0 | 1 |
| 3,6-Dihydroxy-spiro-(2,3-dihydro-1,3-benzoxazine-4-one-2,1'-cyclopentane) | >1.0 | >1.0 | 1.0 | 1.0 | >1.0 | 1.0 | 0.12 | 0.5 | 0.12 | 1.0 | >1.0 | 1.0 | 0.25 | 1.0 | 1 |
| 3-Hydroxy-spiro(2,3-dihydro-1,3-benzoxazine-4-one-2,1'-cycloheptane) | 0.5 | 0.5 | 0.12 | 0.5 0.06p | 0.5 | 0.25 | 0.25 | 0.12 | 0.12 | 0.12 | >1.0 | 1.0 | 0.5 | >1.0 | 1 |

FOOTNOTES TO TABLES

C. a.—Candida albicans (Bergen)
S. c.—Saccharomyces carlsbergensis A. T. C. C. 9080
M. r.—Mucor rammannianus
F. e.—Fusarium epispharia
H. c.—Hormodendrum cladosporoides
T. m.—Trichophyton mentagrophytes
Myco.—Mycobacterium smegmatis A. T. C. C. 607
Staph.—Staphylococcus aureus P. C. I. 209P
Sarc.—Sarcina lutea P. C. I. 1001
Subt.—Bacillus subtilis A. T. C. C. 6633
Pseud.—Pseudomonas aeruginosa
E. coli—Escherichia coli A. T. C. C. 9637
Prot.—Proteus vulgaris A. T. C. C. 8427
Sal.— Salmonella gallinarum
1. Aqueous solutions or suspensions heated to sterilize.
2. Assayed without heat.
3. Compound dissolved in organic solvent. Aqueous dilutions heated to sterilize.

The above tables show the minimal inhibitory concentrations in mg. of compound per ml. of culture medium using the Standard Agar dilution method, which values are equivalent to ten times the percentage of compound in solution on a weight-volume basis. A value of 1.0 mg. per ml. indicates a 0.1% solution, and the smaller the minimal inhibitory concentration, the more effective is the compound against the indicated organism. The above tables show that the present compounds possess activity against three classes of fungi, including human and plant pathogens, and against both gram positive and gram negative bacteria.

The present compounds may be used in solution, as ingredients of fungicidal and antibacterial compositions, or in the form of a dusting powder to inhibit the growth of bacteria and fungi. The dusting powder may have inert ingredients present as carriers, such as talc, keiselguhr, chalk, magnesium oxide and the like.

The following examples describe in detail the preparation of representative dihydrobenzoxazones of the present invention. All parts are by weight unless otherwise indicated.

Example 1.—3 - hydroxy - spiro - (2,3 - dihydro - 1,3 - benzoxazine-4-one-2,1'-cyclohexane

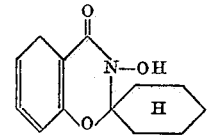

A mixture of 24 parts of salicylhydroxamic acid, 17.2 parts of cyclohexanone, 350 parts of chloroform and 2.75 parts of concentrated sulfuric acid is heated under reflux so that the condensate is returned through a thimble of calcium chloride for five hours, in which time solution of reactants occurs. The reaction mixture is then concentrated until it solidifies. It is stirred with 64 parts of ethanol and then filtered and the crystals washed with a little ethanol. The product is recrystallized from ethanol and then melts at 170°–172° C. The yield of 3-hydroxy-spiro - (2,3 - dihydro - 1,3 - benzoxazine - 4 - one - 2,1' - cyclohexane) is 74%.

*Example 2.—3 - hydroxy - 4' - methyl - spiro - (2,3 - dihydro-1,3-benzoxazine-4-one-2,1'-cyclohexane*

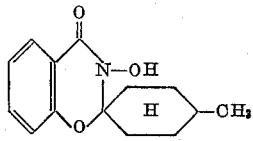

A mixture of 30.6 parts of salicylhydroxamic acid, 23.5 parts of 4-methyl-cyclohexanone, 450 parts of chloroform and 5.5 parts of concentrated sulfuric acid is heated under reflux so that the condensate is returned through a thimble of calcium chloride for five hours. The reaction is concentrated and then diluted with acetone. The insoluble portion is filtered off and recrystallized from dilute ethanol. A yield of 15.2 parts of 3-hydroxy-4'-methyl - spiro - (2,3 - dihydro - 1,3 - benzoxazine - 4 - one-2,1'-cyclohexane), melting at 165°–166° C., is obtained. An additional 5.2 parts is obtained by recovery from filtrates.

*Example 3.—6 - bromo - 3 - hydroxy - spiro - (2,3 - dihydro-1,3-benzoxazine-4-one-2,1'-cyclohexane*

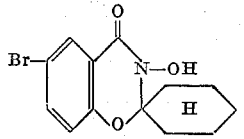

A mixture of 23.2 parts of 5-bromosalicylhydroxamic acid, 11 parts of cyclohexanone, 275 parts of chloroform and 3.6 parts of concentrated sulfuric acid is heated under reflux so that the condensate is returned through a thimble of calium chloride for four hours. The unreacted 5-bromosalicylic acid is filtered off and the chloroform mother liquor is concentrated. The residue is diluted with a little ethanol, filtered and the product recrystallized from 85% ethanol. 6-bromo-3-hydroxy-spiro - (2,3 - dihydro - 1,3 - benzoxazine - 4 -one - 2,1' - cyclohexane), melting at 174.5°–176° C., is obtained.

*Example 4.—3 - hydroxy - 2 - isopropyl - 2,3 - dihydro - 1,3-benzoxazine-4-one*

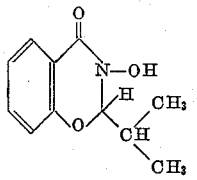

A mixture of 15.3 parts of salicylhydroxamic acid, 40 parts of isobutyraldehyde and a little hydrochloric acid gas is stirred at 30°–35° C. for two hours and then heated at 60°–70° C. for one and one-half hours. The reaction mixture is concentrated under reduced pressure, dissolved in ether and extracted with 2.5 N sodium hydroxide solution. On acidification of the aqueous layer, an oil separates and slowly crystallizes. Recrystallization from dilute ethanol yields 3-hydroxy-2-isopropyl-2,3-dihydro-1,3-benzoxazine-4-one, melting at 114°–115° C.

*Example 5.—3 - hydroxy - spiro - (2,3 - dihydro - 1,3 - benzoxazine-4-one-2,1'-cyclopentane)*

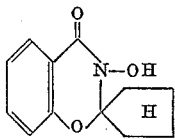

A mixture of 30.6 parts of salicylhydroxamic acid, 18.4 parts of cyclopentanone, 450 parts of chloroform and 3.6 parts of concentrated sulfuric acid is heated under reflux so that the condensate is returned through a thimble of calcium chloride for four and one-half hours. The reaction is concentrated, dissolved in dilute sodium hydroxide solution, treated with activated charcoal and acidified. On recrystallization from dilute ethanol, 3-hydroxy - spiro - (2,3 - dihydro - 1,3 - benzoxazine - 4 - one-2,1'-cyclopentane), melting at 107°–108° C., is obtained.

*Example 6.—3-hydroxy-2-phenyl-2,3-dihydro-1,3-benzoxazine-4-one*

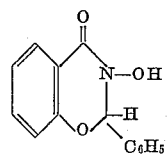

To 30.6 parts of salicylhydroxamic acid, 23.2 parts of benzaldehyde, 375 parts of chloroform is added 5.5 parts of concentrated sulfuric acid and the mixture is heated under reflux so that the condensate is returned through a thimble of calcium chloride for five hours. The insoluble portion is filtered off and the chloroform filtrate is then extracted with dilute sodium hydroxide solution. The alkaline solution is acidified and the product which separates is recrystallized from dilute ethanol. The product, 3 - hydroxy - 2 - phenyl - 2,3 - dihydro - 1,3 - benzoxazine-4-one, melts at 146°–148° C.

*Example 7.—3-hydroxy-3'-methyl-spiro-(2,3-dihydro-1,3-benzoxazine-4-one-2,1'-cyclohexane)*

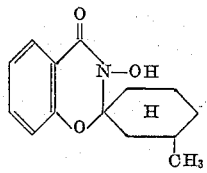

A mixture of 30.6 parts of salicylhydroxamic acid, 23.5 parts of 3-methyl-cyclohexanone, 375 parts of chloroform and 5.5 parts of concentrated sulfuric acid is heated under reflux so that the condensate is returned through a thimble of calcium chloride for five hours. The reaction is concentrated, diluted with acetone and the precipitate which forms is filtered off. Additional product is obtained by concentrating the mother liquor, dissolving in 1 N sodium hydroxide solution, acidifying and recrystallizing the gum which separates from dilute ethanol. The crude yield is 37.3 parts (75%) of a product which melts at 143°–146° C. On recrystallization from 85% acetone, 3-hydroxy - 3' - methyl - spiro - (2,3 - dihydro - 1,3 - benzoxazine-4-one-2,1'-cyclohexane), melting at 146°–147° C., is obtained.

*Example 8.—2-(p-chlorophenyl)-3-hydroxy-2,3-dihydro-1,3-benzoxazine-4-one*

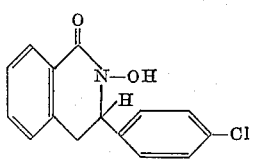

To 30.6 parts of salicylhydroxamic acid, 29.6 parts of p-chlorobenzaldehyde, 450 parts of chloroform is added 5.5 parts of concentrated sulfuric acid and the mixture is heated under reflux for five hours so that the condensate is returned through a thimble of calcium chloride. The reaction is cooled to 5° C. and the insoluble portion is filtered. The chloroform layer is extracted with dilute sodium hydroxide solution. The aqueous layer is acidified and the precipitate which forms is filtered and then recrystallized from 80% ethanol. 19.3 parts of 2-(p-chlorophenyl) - 3 - hydroxy - 2,3 - dihydro - 1,3 - benzoxazine--4-one, melting at 149°-150° C., are obtained.

*Example 9. — 3,6-dihydroxy-spiro-(2,3-dihydro-1,3-benzoxazine-4-one-2,1'-cyclohexane)*

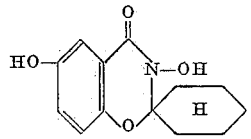

A mixture of 16.9 parts of 5-hydroxy-salicylhydroxamic acid, 15 parts of cyclohexanone, 300 parts of chloroform and 3.6 parts of concentrated sulfuric acid is heated under reflux so that the condensate is returned through a thimble of calcium chloride for twenty-three hours. The insoluble portion is filtered, heated to the boil with 100 ml. of water and again filtered. The insoluble portion is then recrystallized from dilute ethanol. The 3,6-dihydroxy - spiro - (2,3 - dihydro - 1,3 - benzoxazine - 4-one-2,1'-cyclohexane) obtained melts at 203°-204° C.

*Example 10.—3 - hydroxy - spiro - (2,3 - dihydro - 1,3-benzothiazine-4-one-2,1'-cyclohexane)*

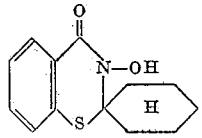

A mixture of 3.38 parts of 2-mercaptobenzhydroxamic acid, 3.0 parts of cyclohexanone, 90 parts of chloroform and 0.72 parts of concentrated sulfuric acid is heated under reflux so that the condensate is returned through a cup of calcium chloride for one hour. The reaction is concentrated and then stirred with a little ethanol. The crystalline product is filtered and recrystallized from ethanol. 3-hydroxy-spiro-(2,3-dihydro-1,3-benzothiazine-4-one-2,1'-cyclohexane) melts at 133°-134° C.

*Example 11*

Following the procedure of Example 8 and substituting O-hydroxybenzaldehyde for p-chlorobenzaldehyde the compound 3 - hydroxy - 2 - (o - hydroxyphenyl) - 2,3-dihydro-1,3-benzoxazine-4-one is obtained, melting at 148°-149.0° C.

*Example 12*

Reacting 5-hydroxysalicylhydroxamic acid, cyclopentanone, chloroform and concentrated sulfuric acid in accordance with Example 5, the compound 3,6-dihydroxyspiro - (2,3 - dihydro - 1,3 - benzoxazine - 4 - one - 2,1'-cyclopentane) is obtained having a melting point of 187°-188° C.

*Example 13*

Following the procedure of Example 3 and substituting cyclopentanone for cyclohexanone the product obtained is 6-bromo-3-hydroxy-spiro-(2,3-dihydro-1,3-benzoxazine-4-one-2,1'-cyclopentane), melting at 156°-157° C.

*Example 14*

Reacting 5-bromosalicylhydroxamic acid, benzaldehyde, chloroform and concentrated sulfuric acid in accordance with Example 6, the compound 6-bromo-3-hydroxy - 2 - phenyl - 2,3 - dihydro - 1,3 - benzoxazine-4-one, having a melting point of 132°-133° C., is obtained.

*Example 15*

By reacting 3-hydroxynaphthohydroxamic acid, cyclohexanone, chloroform and concentrated sulfuric acid, in accordance with Example 3, for six hours, the compound 3 - hydroxy - spiro - (2,3 - dihydro - 1,3 - naphthoxazine-4-one-2,1'-cyclohexane), having a melting point of 185°-187° C. is obtained.

*Example 16*

Following the procedure of Example 1 with a reaction time of three hours and substituting carbon tetrachloride for chloroform, 3-hydroxy-spiro-(2,3-dihydro-1,3-benzoxazine-4-one-2,1'-cyclohexane) is obtained.

*Example 17*

Following the procedure of Example 1, with a reaction time of three hours and substituting benzene for chloroform, 3 - hydroxy - spiro - (2,3 - dihydro - 1,3 - benzoxazine-4-one-2,1'-cyclohexane) is obtained.

*Example 18*

One part by volume of dimethyl sulfate is added to a mixture of 2.41 parts of 3-hydroxy-2-phenyl-2,3-dihydro-1,3-benzoxazine-4-one, and 11 parts by volume of 1 N sodium hydroxide. The reaction is allowed to stand at room temperature for one hour and then heated to 40°-50° C. for one hour. The reaction is cooled and the 3 - methoxy - 2 - phenyl - 2,3 - dihydro - 1,3 - benzoxazine-4-one is filtered, water washed and oven dried. On recrystallizing from ethanol, needles melting at 130°-131° C. are obtained.

*Example 19*

Following the procedure of Example 18 and reacting dimethyl sulfate with 3-hydroxy-spiro-(2,3-dihydro-1,3-benzoxazine-4-one-2,1'-cyclohexane) the product obtained is 3 - methoxy - spiro - (2,3 - dihydro - 1,3 - benzoxazine-4-one-2,1'-cyclohexane).

*Example 20*

A mixture of 2.41 parts of 3-hydroxy-2-phenyl-2,3-dihydro-1,3-benzoxazine-4-one, 11 parts by volume of 1 N sodium hydroxide and 1.4 parts by volume of diethyl sulfate is allowed to react for one hour at 25°-30° C. followed by one-half hour at 40°-50° C. The white precipitate is filtered off and recrystallized from alcohol and water. The 3-ethoxy-2-phenyl-2,3-dihydro-1,3-benzoxazine-4-one melts at 97°-98° C.

*Example 21*

A mixture of 45.9 parts of salicylhydroxamic acid, 36.9 parts of cycloheptanone, 550 parts of chloroform and 5.5 parts of concentrated sulfuric acid is heated under reflux so that the condensate is returned through a cup of calcium chloride for seven hours. The unreacted salicylhydroxamic acid is filtered off and the chloroform layer is extracted with sodium carbonate solution to remove any acidic by-products. On addition of 1 N sodium hydroxide, a precipitate forms and is filtered and washed with a little water. It is suspended in water and acidified with hydrochloric acid. The product is separated and recrystallized from alcohol. 3-hydroxy-spiro-(2,3 - dihydro - 1,3 - benzoxazine - 4 - one - 2,1' - cycloheptane) melts at 118°-120° C.

I claim:
1. A compound having the formula

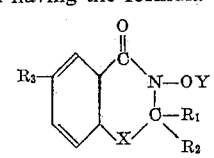

in which X is a member of the group consisting of oxygen and sulfur radicals, Y is a member of the group consisting of hydrogen and lower alkyl radicals, $R_1$ is hydrogen, $R_2$ is a member of the group consisting of lower alkyl, phenyl, monohalophenyl and monohydroxyphenyl radicals, $R_1$ and $R_2$ taken together form a member of the group consisting of tetramethylene, pentamethylene, hexamethylene and monolower alkyl-substituted-pentamethylene radicals and $R_3$ is a member of the group consisting of hydrogen, hydroxyl and halogen radicals.

2. 3 - hydroxy - spiro - (2,3 - dihydro - 1,3 - benzoxazine-4-one-2,1'-cyclohexane).

3. 6 - bromo - 3 - hydroxy - spiro - (2,3 - dihydro - 1,3-benzoxazine-4-one-2,1'-cyclohexane).

4. 3,6 - dihydroxy - spiro - (2,3 - dihydro - 1,3 - benzoxazine-4-one-2,1'-cyclopentane).

5. 3 - hydroxy - 2 - isopropyl - 2,3 - dihydro - 1,3-benzoxazine-4-one.

6. 3 - hydroxy - spiro - (2,3 - dihydro - 1,3 - benzoxazine-4-one-2,1'-cyclopentane).

7. A method of preparing compounds having the general formula:

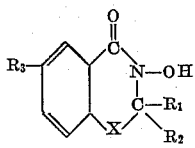

in which X is a member of the group consisting of oxygen and sulfur radicals, $R_1$ is hydrogen, $R_2$ is a member of the group consisting of lower alkyl, phenyl, monohalophenyl and monohydroxyphenyl radicals, $R_1$ and $R_2$ taken together form a member of the group consisting of tetramethylene, pentamethylene, hexamethylene and monolower alkyl-substituted-pentamethylene radicals and $R_3$ is a member of the group consisting of hydrogen, hydroxyl and halogen radicals, which comprises heating a hydroxamic acid having the formula

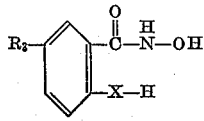

in which $R_3$ and X are as defined above with a carbonyl compound having the formula

in which $R_1$ and $R_2$ are as defined above, in the presence of a mineral acid.

8. A method of preparing 3-hydroxy-spiro-(2,3-dihydro-1,3-benzoxazine-4-one-2,1'-cyclohexane) which comprises heating salicylhydroxamic acid with cyclohexanone in a solvent to a temperature within the range of 50° C. to refluxing in the presence of a mineral acid.

9. A method of preparing 6-bromo-3-hydroxy-spiro-(2,3 - dihydro - 1,3 - benzoxazine - 4 - one - 2,1' - cyclohexane) which comprises heating 5-bromosalicylhydroxamic acid with cyclohexanone to a temperature within the range of 50° C. to refluxing in the presence of a mineral acid.

10. A method of preparting 3,6-dihydroxy-spiro-(2,3-dihydro-1,3-benzoxazine-4-one-2,1'-cyclopentane) which comprises heating 5-hydroxysalicylhydroxamic acid with cyclopentanone in a solvent to a temperature within the range of 50° C. to refluxing in the presence of a mineral acid.

11. A method of preparing 3-hydroxy-2-isopropyl-2,3-dihydro-1,3-benzoxazine-4-one which comprises heating salicylhydroxamic acid with isobutyraldehyde to a temperature within the range of 50° C. to refluxing in the presence of a mineral acid.

12. A method of preparing 3-hydroxy-spiro-(2,3-dihydro-1,3-benzoxazine-4-one-2,1'-cyclopentane which comprises heating salicylhydroxamic acid with cyclopentanone in a solvent to a temperature within the range of 50° C. to refluxing in the presence of a mineral acid.

No references cited.